US005107221A

United States Patent [19]

N'Guyen et al.

[11] Patent Number: 5,107,221

[45] Date of Patent: Apr. 21, 1992

[54] ELECTRON ACCELERATOR WITH COAXIAL CAVITY

[75] Inventors: Annick N'Guyen, Bures sur Yvette; Jacques Pottier, Orsay, both of France

[73] Assignee: Commissariat a l'Energie Atomique, Paris, France

[21] Appl. No.: 449,955

[22] PCT Filed: May 25, 1988

[86] PCT No.: PCT/FR88/00262

§ 371 Date: Oct. 31, 1989

§ 102(e) Date: Oct. 31, 1989

[87] PCT Pub. No.: WO88/09595

PCT Pub. Date: Dec. 1, 1988

[30] Foreign Application Priority Data

May 26, 1987 [FR] France ................................ 87 07378

[51] Int. Cl.$^5$ ................................ H01S 23/12

[52] U.S. Cl. ................................ 328/233

[58] Field of Search ........................ 328/229, 230, 233; 315/5.39, 5.41

[56] References Cited

FOREIGN PATENT DOCUMENTS 1136936 5/1957 France .
1555723 12/1968 France .
2260253 8/1975 France .

*Primary Examiner*—Sandra L. O'Shea

*Attorney, Agent, or Firm*—Oblon, Spivak, McClelland, Maier & Neustadt

[57] ABSTRACT

According to the invention, use is made of a coaxial cavity (CC) resonating according to the fundamental mode and the electrons are injected in the median plane perpendicular to the axis. The beam can be accelerated several times along different diameters (d1,d2) by reinjecting into the cavity and using electron deflectors (D1,D2).

3 Claims, 2 Drawing Sheets

FIG.1
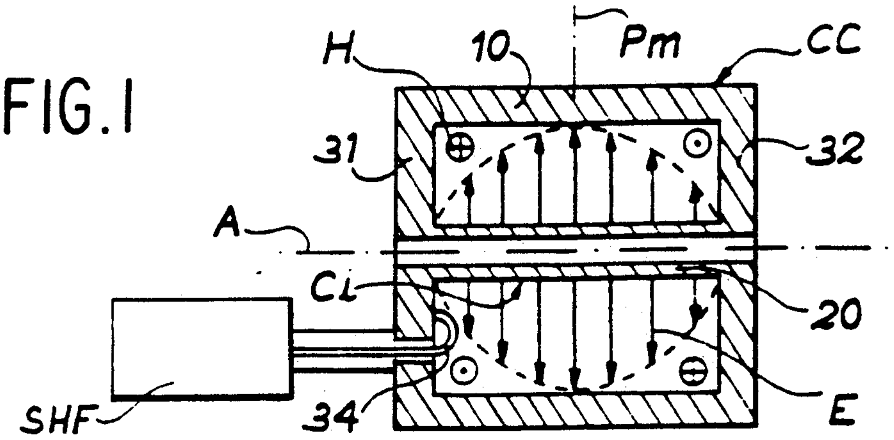
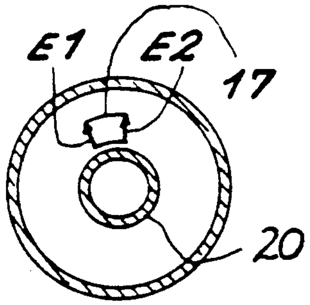
FIG.2(a)
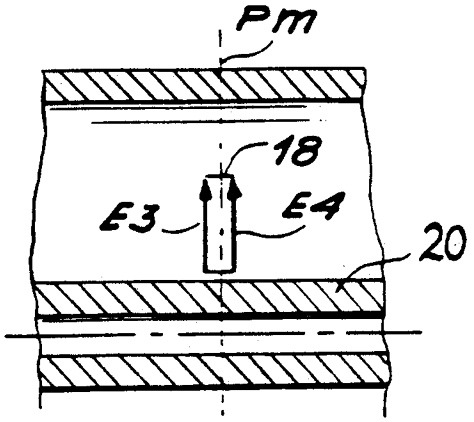
FIG.2(b)
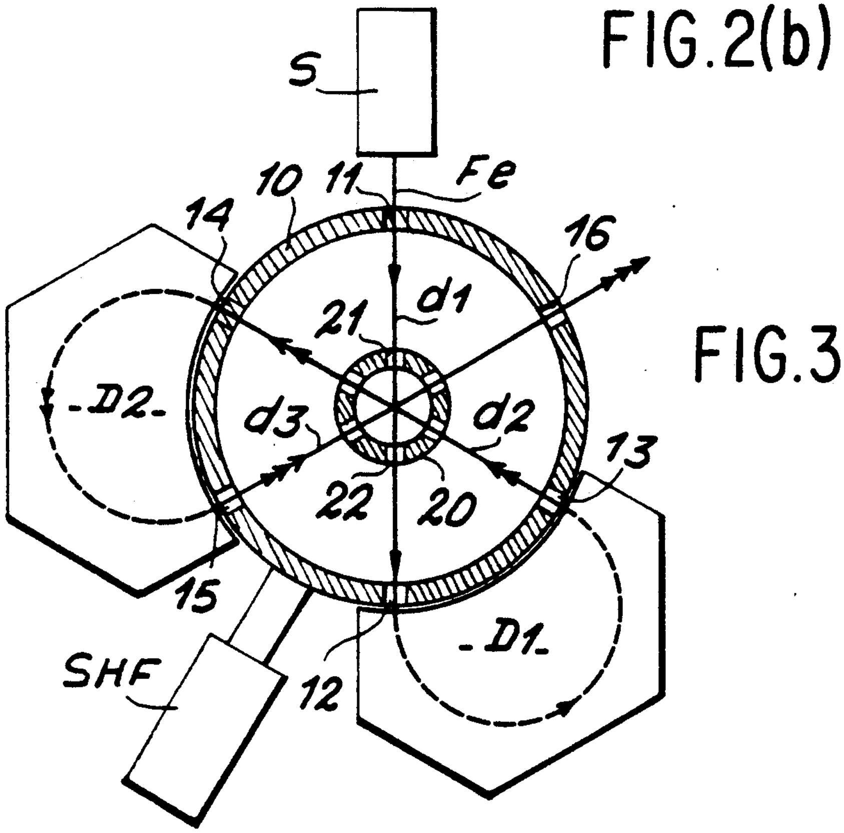
FIG.3

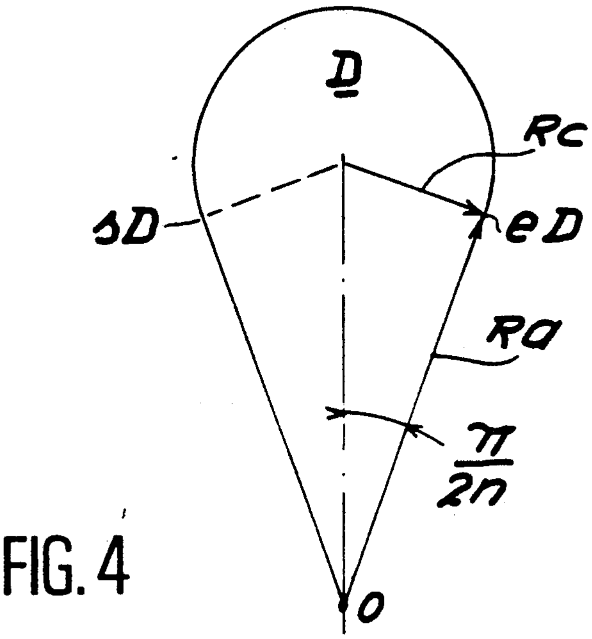
FIG. 4
FIG. 5
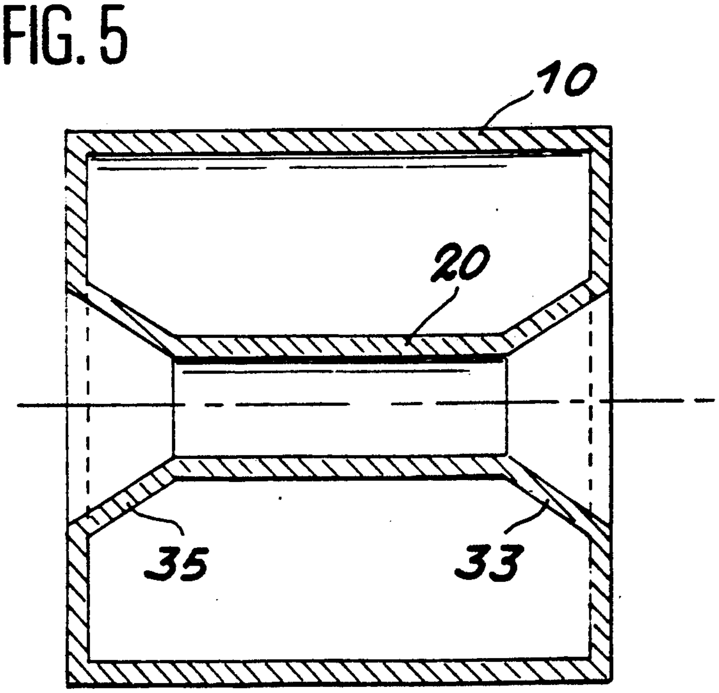

ELECTRON ACCELERATOR WITH COAXIAL CAVITY

The present invention relates to an electron accelerator. It is used in the irradiation of various substances, such as agro-alimentary products, either directly by electrons, or by X-rays obtained by conversion on a heavy metal target.

An electron accelerator is known, which in general terms comprises a resonant cavity energized by a high frequency field source and an electron source able to inject electrons into the cavity. If certain phase and velocity conditions are satisfied, the electrons are accelerated by the electric field throughout their passage through the cavity.

In accordance with this principle, in certain accelerator types, the electron beam passes through the cavity several times. The apparatus then comprises an electron deflector receiving the once accelerated beam, which then deflect it by approximately 180° and reinject it into the cavity for a further acceleration. A second deflector can again deflect the beam which has undergone two accelerations, so that it is made to pass through the cavity a third time and in this way obtain a third acceleration and so on. Such an apparatus is e.g. described in French Patent 1 555 723 entitled "100 MeV continuously operating electron accelerator".

This type of accelerator suffers from the following disadvantage. During the first injection into the cavity, the electron beam follows a path coinciding with the axis thereof. Along this path the electric field only has a single component directed along the axis. Thus, acceleration of the electrons takes place and there is no deflection of the beam because there is no transverse component of the magnetic field.

However, during the second passage through the cavity, the electron beam takes a path which is no longer directed along said axis. A magnetic component perpendicular to the axial component of the electric field can act on the electron beam, so that the electrons are deflected. This deflection will depend on the phase of the electromagnetic field which leads to a dispersion of the beam and consequently part will be lost on the walls of the cavity. Moreover, this parasitic phenomenon increases during multiple passages, However, multiple passage accelerators are known, which obviate this problem as a result of a special deflector structure. According to this variant, e.g. described in U.S. Pat. No. 3 349 335, the electrons perform a complete loop outside the cavity and are reinjected into its axis.

According to another variant described in FR-A-1 136 936, acceleration takes place in a resonant cavity and after each passage the electrons are deflected outside the cavity so that they pass round the same and are reinjected into the acceleration axis.

According to yet another variant, sometimes called the Duotron, the electron beam is reflected on itself and thus performs an outward and return travel along the cavity axis.

In these improved variants, the electron beam, during these multiple passages, still follows the path for which the deflecting fields are zero (the electric field is parallel to the velocity vector of the electrons and is oppositely directed).

However, these apparatuses have a complex construction. In the first two, the various electron paths have a common branch coinciding with the cavity axis, but the other branches are outside the cavity which increases the complexity and overall dimensions of the apparatus. In the last, there is a limitation to a single and outward and return path of the beam and it is not easy to solve the problem of reflecting the electrons back on themselves.

The present invention aims at obviating these disadvantages. For this purpose, it proposes an electron accelerator benefiting from the effects of multiple passages, whilst retaining the condition referred to hereinbefore concerning the absence of deflecting fields along the paths taken by the electrons and which simplifies the problems associated with the deflection and reinjection of the electrons into the accelerating cavity.

More specifically, the present invention relates to an electron accelerator of the multiple acceleration type referred to hereinbefore and more particularly described in FR-A-1 136 936 and which is characterized in that the conductors inside and outside the cavity are cylindrical and the electron beam is injected into a plane perpendicular to the axis of the cavity, where the radial component of the electric field is at a maximum and in that the deflection means comprise a first electron deflector having an inlet facing a first outlet port made in the outer conductor and diametrically opposite to the first inlet port according to a first diameter, said first deflector having an outlet facing the second inlet port made in the outer conductor, a second electron deflector having an inlet facing a second outlet port made in the outer conductor and diametrically opposite to the second inlet port according to a second diameter differing from the first, said second deflector having an outlet facing a third inlet port made in the outer conductor and ...probably other deflectors associated in the same fashion to other diameters of the external conductor, distinct of one another.

In any event, the characteristics of the invention will be defined more clearly with the description hereunder. This description refers to drawings attached thereto wherein:

- FIG. 1 displays a resonant coaxial cavity according to the fundamental mode,
- FIG. 2 makes it possible to illustrate a property of the coaxial cavity based on the absence of a magnetic field in the median plane of the cavity,
- FIG. 3 displays in a cross section an electron accelerator according to the invention,
- FIG. 4 illustrates geometrical characteristics of the device of the invention, and
- FIG. 5 displays a variation in the execution of the invention, which is designed to reduce chemical losses.

In FIG. 1, we see a coaxial cavity cc comprised of an external cylindrical conductor 10, an internal cylindrical conductor 20, and two flanges 31 and 32.

Such a cavity is energized by a high frequency source SHF, has an Axis A and a median plane. Pm perpendicular to the axis. Among all the possible resonance modes of such a cavity, there is one, called the fundamental mode which is of the transverse electric type, for which the electric field E is purely radial in the median plane and decreases on either side of said plane to be canceled out on flanges 31,32. Conversely, the magnetic field is at a maximum along the flanges and is canceled out in the median plane on changing direction.

In accordance with convention, such a mode can be designated $TE_{001}$, the initials TE indicating that it is a mode where the electric field is transverse, in which the first 0 indicates that the field has the symmetry of revolution, the second 0 indicates that there is no canceling out of the field along one radius of the cavity and the FIG. 1 indicates that there is a half-cycle of the field in a direction parallel to the axis. Such a cavity can be energized by a high frequency source SHF coupled to the cavity by a loop 34.

According to the invention, the electron beam is injected into the coaxial cavity in the median plane thereof. Thus, it is in this plane that there is no parasitic field liable to deflect the beam. As this point is vital, it is possible to stop here. On part a of FIG. 2, it is possible to see the cavity in cross-section in the median plane. The electric fields E1 and E2 are equal along two separate radii. A contour 17 is defined by these two radii and by two circular arcs along which the electric field is radial. The circulation of the electric current (i.e. the integral of this field) is zero along said contour. Thus, the flux of the magnetic induction through a surface dependent on said contour is also zero. In other words, there is no magnetic component perpendicular to the median plane.

In part b of FIG. 2, it is possible to see the cavity in longitudinal section. As the electric field is symmetrical with respect to the median plane, fields E3 and E4 along two infinitely close radii and on either side of said plane are equal. The circulation of the electric field along a contour 18 constituted by these two radii and by two longitudinal branches is zero. Thus, the induction flux across a surface dependent on said contour is also zero. In other words, there is no magnetic component in the median plane.

Thus, there is no magnetic component in the median plane Pm (i.e. the median plane of the cavity is a purely capacitive zone). Thus, the electron beam will not be exposed to any deflecting force.

FIG. 3 diagrammatically shows a complete accelerator according to the invention. The apparatus comprises an electron source S, a coaxial cavity CC, formed by an external cylindrical conductor 10 and an internal cylindrical conductor 20, as well as two electron deflectors D1 and D2 and a high frequency source SHF.

The apparatus functions as follows. Electron source S emits an electron beam Fe directed in the median plane of the coaxial cavity CC shown in section (the plane of the drawing being the median plane). The beam enters the cavity through an opening 11 and passes through the cavity in accordance with a first diameter d1 of the external conductor. The internal conductor 20 has two diametrically opposite openings 21,22. The electron beam is accelerated by the electric field if the phase and frequency conditions are satisfactory (the electric field must remain in the opposite sense to the velocity of the electrons). The accelerated beam leaves the cavity through an opening 12 diametrically opposite to opening 11 and is then deflected by a deflector D1.

The beam is reintroduced into the coaxial cavity through an opening 13. It then follows a second diameter d2 and undergoes a second acceleration in the cavity. It passes out through opening 14 and then the beam is again deflected by a deflector D2 and is reintroduced into the cavity through an opening 15. It follows a third diameter d3 and undergoes a third acceleration, and exits via opening 16.

As the principle of the accelerator according to the invention has now been defined, a few practical considerations will now be developed more particularly with regards to the synchronism condition to be respected and the shunt impedance.

1. SYNCHRONISM CONDITION.

The coaxial character of the acceleration structure means that the electric field does not have the same direction in the first and second halves of the path taken by the electrons in the cavity, i.e. along the radius passing from the external conductor to the internal conductor and then along the radius from the internal conductor to the external conductor. The spatial variation of the field is accompanied by a time variation, because the field has a high frequency (a few hundred megahertz). Advantage is taken of these two variations by injecting the beam in such a way that the electric field is canceled out at the instant where the electrons pass through the central conductor. The time taken by the electrons to pass from one conductor to the other must consequently be below the half-cycle of the field. The time taken by the electrons to pass through the entire cavity is consequently less than the cycle of the field. As the electrons are quasi-relativistic, it can be considered that their velocity is close to the speed of light c. Thus, we obtain $d2/c)<T$, condition which can be written $d2 \leqq \lambda$, in which $\lambda$ is the wavelength of the electromagnetic field and d2 is the diameter of the external conductor. On designating by L the length of the path taken by the electrons outside the cavity, particularly in the deflector, it is possible to obtain a supplementary condition, i.e.:

$d2+L=k\,\lambda$, in which k is an integer.

In order to reduce the overall dimensions of the apparatus, it is desirable to have $k=1$. However, in certain special cases, $k=2$ may be chosen (e.g. for more easily locating a focusing system between the deflection magnets and the cavity, or to have a larger radius of curvature in order to use a lower induction). It will be assumed hereinafter that condition $d2+L=\lambda$ is satisfied.

Rc is the radius of curvature in one of the deflectors and Ra is the distance between the cavity axis and the entrance eD or exit sD of said deflector. These quantities are illustrated in FIG. 4. Moreover, the angle between two paths is equal to $\pi/2n$, so that the following relations are obtained:

$$Rc = Ra\ tg\frac{\pi}{2n}$$

$$L = \frac{n+1}{n}\pi Rc$$

hence $$\left[2 + \frac{n+1}{n}\pi tg\frac{\pi}{2n}\right]Ra = \lambda$$

For example, for $n=6$ and $n=8$ we respectively obtain:

$$Ra \simeq \frac{\lambda}{2.98} \qquad Rc \simeq 8.99 \cdot 10^{-2}\lambda$$

$$Ra \simeq \frac{\lambda}{2.70} \qquad Rc \simeq 7.37 \cdot 10^{-2}\lambda$$

For a wavelength of 3m which corresponds to a frequency of 100 MHz, we respectively obtain:

| | |
|---|---|
| Ra = 101 cm | Rc = 27 cm |
| Ra = 111 cm | Rc = 22.1 cm |

The external radius R2 defining the field of the cavity must obviously be smaller than Rc in order to take account of the thickness of the wall and possibly make it possible to locate between the latter and the deflector auxiliary focusing devices. The dimensions calculated hereinbefore are compatible with these practical requirements.

2. SHUNT IMPEDANCE.

The electrical quality of an accelerating cavity is conventionally characterized by its effective shunt impedance $Zs_{eff}$, ratio of the square of the energy gained by the electron during a passage through the cavity (expressed in electron volt) to the power dissipated by the Joule effect For example, for a cavity operating at 100 MHz and taking R2=0.8m, a relatively flat maximum of $Zs_{eff}$ is obtained in the vicinity of $(R1/R2)=\frac{1}{4}$.

Under these conditions calculation gives $Zs_{eff} \approx 10$ MΩ and to obtain an energy gain of 10 MeV with six passages, the dissipated power would be 278 kW.

The shunt impedances obtained in practice are somewhat below the theoretical values and in fact the dissipated power is close to 350 kW.

For homothetic cavities, the shunt impedance is proportional to the root of the wavelength. A cavity operating at 700 MHz increasing the energy of the electrons by 5 MeV would thus consume approximately 125 kW.

For a different number of passages, the radii of the cavity would differ somewhat, but the shunt impedance would differ little and as a first approximation the dissipated power would vary in inversely proportional manner to the number of passages.

Therefore it is advantageous to use a large number of passages. In practice, this is limited by the correlative reduction in the radii of curvature of the beam in the deflecting magnets, which on the one hand lead to a reduction of the passage cross-section offered to the beam and on the other hand requires an induction increase.

The necessary powers are compatible with a continuous operation and do not require the use of relatively complex and costly pulse generators.

It is possible to reduce the ohmic losses due to the currents circulating in the cavity flanges by modifying the shape of the internal conductor, as illustrated in FIG. 5. The internal conductor 20 is terminated by two truncated cone-shaped portions 33,35. The inductance of the cavity is reduced. In order to retain the same frequency, it is necessary to increase the capacitance and therefore lengthen the cavity somewhat.

The advantage resulting from such an arrangement with regards to the shunt impedance is not very great (approximately 10%). However, this arrangement has the advantage of greatly decreasing the maximum dissipated power per surface unit (2 to 4 times less than with the coaxial cavity), which can be of interest for facilitating cooling and reducing disturbing effects (sag, internal tensions, etc.) due to the heat gradient in the walls.

Moreover, the inventors have revealed a considerable reduction to the transverse dimensions of the beam and a reduced sensitivity to misadjustments through using deflecting magnets whose faces, at the beam entrance and exit, are tangential to a dihedron with an apex angle close to $\pi(1-(\frac{1}{2}n))$, if n is the number of passages through the cavity by the beam.

We claim:

1. Electron accelerator of the type comprising a resonant cavity with an outer conductor (10) and an inner conductor (20) having the same axis of revolution (A), a high frequency source (SHF) coupled to the cavity and supplying an electromagnetic field at a resonant frequency of the cavity, an electron source (S) able to inject into the cavity an electron beam (Fe) through a first inlet port (11) made in the outer conductor (10), the beam being injected along an electric field line (E) of the resonant field, means for deflecting electrons placed outside the cavity, said accelerator being characterized in that the inner and outer conductors of the cavity are cylindrical and the electron beam is injected in a plane perpendicular to the axis of the cavity where the radial component of the electric field is at a maximum and in that the deflection means comprise a first electron deflector (D1) having an inlet facing the first outlet port (12) made in the outer conductor (10) and diametrically opposite to the first inlet port (11) according to a first diameter (d1), said first deflector having an outlet facing a second inlet port (13) made in the outer conductor (10), a second electron deflector (D2) having an inlet facing a second outlet port (14) made in the outer conductor (10) and diametrically opposite to the second inlet port (13) according to a second diameter (d2) different from the first diameter (d1), said second deflector (D2) having an outlet facing a third inlet port (15) made in the outer conductor (10) and optionally further deflectors associated in the same way with other diameters of the outer conductor (10) and which all differ from one another, but are all located in said plane.

2. Accelerator according to claim 1, characterized in that the central conductor (20) has truncated cone-shaped ends (33,35).

3. Accelerator according to claim 2, having n passages of the cavity by the beam, characterized in that use is made of electron deflectors with magnets, whose faces, at the beam entrance and exit, are tangential to a dihedron with an apex angle close to $\pi(1\frac{1}{2}n)$.

* * * * *